United States Patent [19]
Narasimha et al.

[11] Patent Number: 6,125,125
[45] Date of Patent: Sep. 26, 2000

[54] SYNCHRONIZATION OF TDMA CELL SITES

[75] Inventors: Madihally J. Narasimha; Kishan Shenoi, both of Saratoga, Calif.

[73] Assignee: Symmetricom, Inc., San Jose, Calif.

[21] Appl. No.: 08/950,429

[22] Filed: Oct. 15, 1997

Related U.S. Application Data

[60] Provisional application No. 60/028,151, Oct. 18, 1996, abandoned.

[51] Int. Cl.[7] ....................................................... H04J 3/06
[52] U.S. Cl. ........................................... 370/510; 370/512
[58] Field of Search ................................... 370/509, 510, 370/512, 328, 336, 337, 347, 350, 503, 514, 516, 517; 455/502, 503, 486; 375/356, 365

[56] References Cited

U.S. PATENT DOCUMENTS

| | | | |
|---|---|---|---|
| 4,475,246 | 10/1984 | Batlivala et al. ......................... | 355/18 |
| 4,622,665 | 11/1986 | Jonsson et al. .......................... | 370/516 |
| 4,890,303 | 12/1989 | Bader ...................................... | 370/516 |
| 5,261,118 | 11/1993 | Vanderspool, II et al. ............... | 455/51 |
| 5,450,450 | 9/1995 | Lee .......................................... | 375/354 |
| 5,727,034 | 3/1998 | Ojaniemi ................................. | 375/356 |
| 5,790,939 | 8/1998 | Malcolm et al. ......................... | 455/13 |

*Primary Examiner*—Salvatore Cangialosi
*Attorney, Agent, or Firm*—Wilson, Sonsini, Goodrich & Rosati

[57] ABSTRACT

New methods for synchronizing previously unsynchronized BTS's of time division multiple access cellular networks are disclosed. Timing information that is readily available throughout the network is used to determine for each BTS when information representing a particular event is transmitted relative to the timing information. The time differences that are detected are used for steering the clock of each BTS to have the next or some other subsequent event transmitted at the same time.

11 Claims, 2 Drawing Sheets

SYNCHRONIZATION OF TDMA CELL SITES

CROSS-REFERENCE TO RELATED APPLICATION

This utility application claims the benefit of the filing date of provisional application Ser. No. 60/028,151, filed Oct. 18, 1996, SYNCHRONIZATION OF TDMA CELL CITES, Narishimha, et al now abandoned.

BACKGROUND OF THE INVENTION

1. Field of the Invention

This invention relates to synchronization of cell sites in time division multiple access cellular networks and in particular synchronizing the transmission of frame emission times in such cellular networks from each of the nodes.

2. Description of the Related Art

In typical time division multiple access communication networks such as GSM cellular networks that are commonly found in Europe and TDMA networks that are found in the United States operating according to TIA Standard IS-54B, the geographic area of the network is divided into a plurality of cells. Located in the approximate geographic center of each cell is a base transceiver station (BTS).

According to the network protocol, each frequency channel is typically split into many separate time multiplexed channels or time slots on that frequency channel. The BTS's transmit continuously on a plurality of frequency channels in use with the frames being transmitted divided among the time slots. The mobile transceivers receive and process only one of the time slots and also transmit on one time slot in the appropriate reverse frequency channel. Because the mobile transceivers must not interfere with other mobiles using the same frequency channel within that cell site, it is necessary to synchronize all of the mobile receivers within a cell operating on the same reverse frequency channel with each other and the BTS.

Furthermore, the BTS transmits a training sequence in the middle of every time slot so that the mobile can learn the characteristics of the intervening radio path and train its equalizer. Accurate training of the equalizer is essential to properly decode the voice and other control information sent by the BTS.

However, in conventional TDMA cellular networks such as GSM, the BTS of a cell is not synchronized to the BTS of an adjacent cell. As a result, at any location in the network, a mobile will receive the training sequence transmitted from the BTS for its cell and will also receive probably at a different time the training sequence from BTS's of other cells. This is one form of what is commonly co-channel interference. It causes problems in the training of the equalizer of the mobile for training purposes.

While it might be possible to synchronize the network so that all cells are emitting their frames simultaneously, the problem with this is it requires modification to the existing infrastructure equipment in the network. Obviously, with the heavy capital investment in existing networks and the capital investment in existing BTS design, it is highly undesirable to do this.

Therefore, it is a first object of the invention to permit synchronizing the frame emission times of all of the transmitters within the network. It is a second object of the invention to permit such synchronization without modifying the existing infrastructure equipment or causing either changes in design or programming of the mobile units. It is yet a third object of the invention to permit synchronized handoffs. It is yet a fourth object of the invention to provide synchronization so that mobile units can determine their geographic location within the network.

SUMMARY OF THE INVENTION

These and other objects are achieved by including in association with a plurality of the BTS's in the network a device for measuring the timing of some aspect of the signal transmitted on at least one channel, a device for comparing the timing of the signal with the timing of a universal time source such as GPS, and a device for stepping the phase of the timing signal provided to the BTS. Each such BTS is a synchronized BTS with the synchronization obtained by separately stepping the phase of the timing signal provided to each synchronized BTS to shift the timing of the frames being transmitted by the BTS so that the frame timing as transmitted will occur at substantially the same time. Since the frames of each synchronized BTS will be synchronized to a universal time source such as GPS, the frames detected by the mobiles from various different BTS including the current BTS and the co-channel interferers should be substantially the same but for propagation delays through ether.

DETAILED DESCRIPTION OF THE FIGURES

Figure 1:
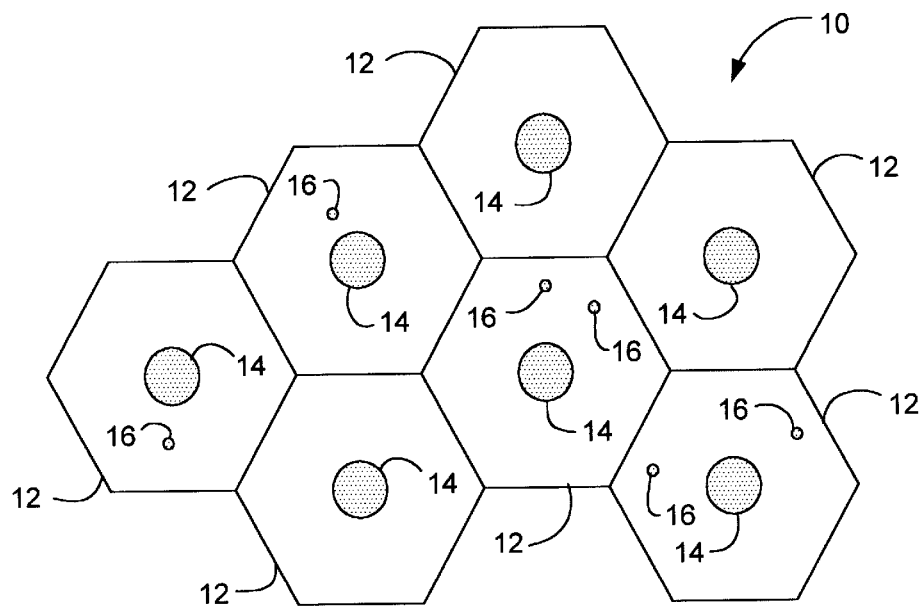
FIG. 1 is a diagram of a portion of a cellular network.

FIG. 1 is a diagram of a portion of a cellular time division multiple access network 10 that may be operated according to the GSM protocol, the IS-54 protocol promulgated by the TIA or a PCS network operating according to another protocol but using time division multiple access. The network 10 is divided into a plurality of cells 12. Located preferably approximately at the geographic center of each cell 12 is a base transceiver station (BTS) 14 for transmitting forward channel signals to a plurality of mobile units 16 in that cell where the mobiles receive those signals and transmit reverse channel signals back to the BTS 14 within the cell 12 according to the network protocol.

Each BTS 14 in the network 10 will broadcast on at least one and preferably on a plurality of forward frequency channels with the BTS's 14 in adjacent cells using different frequency channels. Non-adjacent BTS's 14 use at least some of the same frequency channels as each other, thereby causing co-channel interference. The BTS's 14 transmit preferably in a frame format with the frame being divided into two or more time slots, each time slot being used for transmitting a different time multiplexed channel. A mobile unit 16 that is being used for one call only processes the information in specified time slots of the forward channel frame.

The mobile units 16 also transmit using frames in the reverse direction using different frequency channels. However, each mobile unit 16 only transmits for a portion of the total available time, using predetermined time slots. Obviously, each mobile unit 16 in a cell 12 transmitting on the same frequency channel must transmit in different time slots. Therefore, to receive the digital data on the forward channel and to transmit the digital data on the reverse channel, the mobile units 16 must synchronize to the timing of the BTS 14 for the cell 12 where the mobile unit 16 is located.

Still further, when a mobile unit 16 is handed off to the BTS 14 of an adjacent cell 12, the mobile unit 16 must resynchronize to the timing of the BTS 14 of the adjacent cell 12.

Each BTS 14 transmits a training sequence in every time slot to facilitate training of the equalizer in the mobile unit 16. For example, in GSM systems, a twenty six bit training sequence is transmitted in the middle of the time slot. Preferably, the training sequence transmitted from one BTS 14 is different than the training sequence transmitted by the other BTS's 14 that can cause co-channel interference. Further these training sequences are orthogonal and will not interfere with each other if received at a mobile unit at precisely the same time. Each mobile unit 16 can therefore train its equalizer properly and more accurately to decode the voice and control information transmitted by the BTS 14 if the frame emission times occur simultaneously.

Figure 2A:
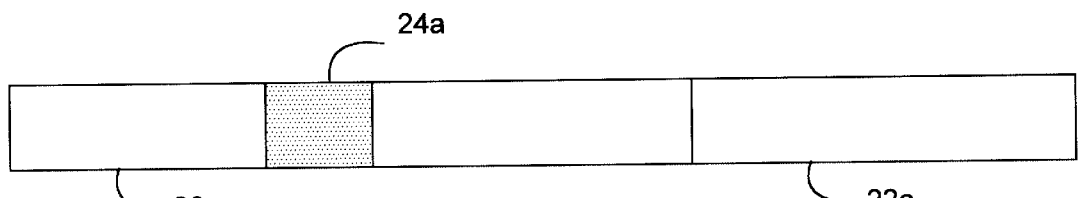
FIGS. 2A and 2B are timing diagrams that are useful for explaining an embodiment of the invention.
Figure 2A:
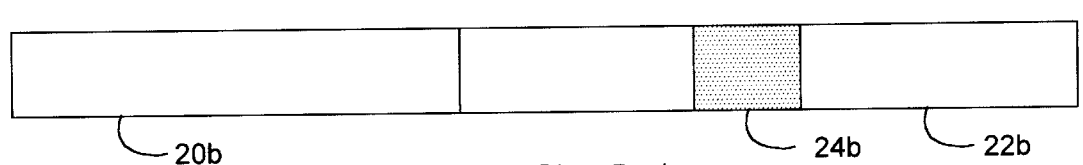

However, as noted above, BTS's 14 are not synchronized in conventional time division multiple access networks. Thus, as shown in FIG. 2A, a mobile unit 16 that is operating in a first cell 12 will receive a series of frames 20a, 22a from the BTS 14 of that cell 12 with a training sequence 24a occurring at a first particular time in the frame. However, due to the fact that the various BTS's 14 operating on the same frequency channel are not synchronized to each other, a training sequence 24b that is part of a frame 20b transmitted from a second BTS operating on the same frequency channel is probably not received at the same time. Hence, even though the training sequences 24a and 24b are orthogonal code words, since they are not detected simultaneously generally at the mobile but rather are detected sequentially, there will be co-channel interference in the equalizer.

To synchronize such conventional BTS's 14 without altering the network protocol, a uniform time source that may be available throughout the geographic coverage should be used to cause a particular event in each frame to be transmitted on the network to occur as close as possible to a preordained time. For example, if the once per second GPS timing is available, it may be desirable to cause a frame emission time to start transmitting with the occurrence of (or some predetermined period after) the once per second pulse. Thus, at each BTS 14 within the network 10, the frame would be transmitted simultaneously for all channels, thereby providing synchronization. While with most protocols, a number of frames will occur between the GPS timing pulses, the local clock of the BTS 14 is reasonably accurate enough so that synchronization will be maintained throughout the network 10.

Rather than use the raw received once-per-second GPS time, it is best to process the received GPS time using an algorithm such as BESTIME™ available from Telecom Solutions of San Jose, Calif. Preferably the once per second pulse is provided at a receiver located adjacent to the BTS antenna. The time period from the pulse to the next frame on a particular frequency channel for the BTS 14 is measured. The time difference (the error information) between when the once per second pulse occurs and the detection of the frame then indicates how far out of synchronization the BTS 14 is. This error may then be corrected according to a closed loop filtering algorithm wherein the timing of the BTS 14, which preferably is also derived from the once per second pulse, is phase stepped to eliminate the error.

Figure 3:
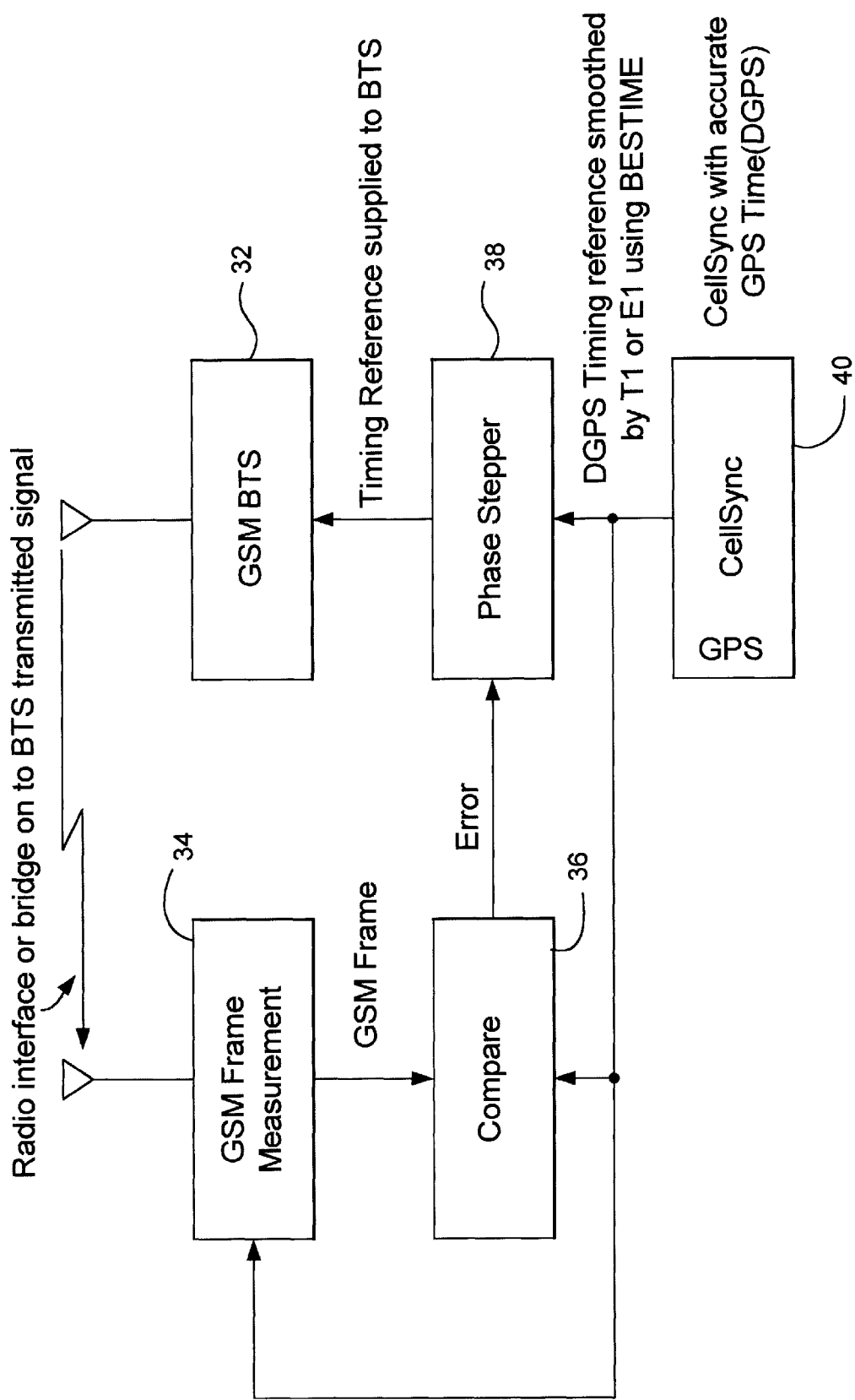
FIG. 3 is a block diagram of an embodiment of the invention.

For example, referring to FIG. 3, preferably associated with each GSM BTS 32 is a GSM Frame Measurement device 34, a timing comparator 36, a phase stepper 38, and a local timing reference generator 40, which may be a CellSync available from Telecom Solutions of San Jose, Calif. The CellSync 40 generates a timing reference signal that is tied to a time scale available throughout the network, such as GPS as smoothed by the BESTIME algorithm. The generation of such a one pulse per second timing reference signal smoothed to reduce noise and jitter is described in the assignee's U.S. patent application Ser. No. 08/278,423, to Zampetti, filed on Jul. 23, 1994 and issued as U.S. Pat. No. 5,666,330 on Sep. 9, 1997. The timing information of the once per second pulse is provided to the phase stepper, the comparator and the GSM Frame Measurement Device.

The Frame Measurement Device 34 either receives a feed directly from the GSM transmitter or preferably includes a GSM receiver and receives preferably one forward channel transmitted by the BTS 32 for that cell. The GSM Frame Measurement Device 34 takes the demodulated and recovered frame for a selected forward channel. Using the timing information, the GSM Frame Measurement Device 34 samples periodically (such as once per second) at what point in time, based upon the GPS time scale, a particular event in the frame occurred. Examples of events are the start or the completion of the frame header or the start or the completion of the training sequence. The actual time when the frame event occurred is compared with the desired time (such as to coincide with a particular after the once per second pulse) by the timing comparator 36. An error signal is generated indicating the amount and direction (early or late) of the error. This error information is supplied to the phase stepper 38, which may be an NCO along and an appropriate controller (not shown). Using an appropriate filtering algorithm implemented by the controller, the phase stepper causes a phase shift of the GPS timing signal provided by the Cell Sync 40 or other GPS timing source to steer the phase or the frequency of the timing signal. As the phase of the timing signal is advanced or retarded over time, the point in time where the particular frame event will occur, such as the timing of the synchronization code, is either advanced or delayed. Since the system of FIG. 3 is provided in association with either a plurality or preferably each of the BTS's 32 in the network, each of the BTS's 32 is in substantial synchronization with each of the other BTS's 32.

In particular, the correction algorithm used by the controller of the Phase Stepper 38 takes the timing error measurement and implements a type If filtering algorithm such as the one described in the above referenced patent application to drive the timing of the event to be the desired time. For example, the samples of the timing error may be made once per second. This timing information is summed and averaged over a predetermined number of samples. The phase of the timing signal for the BTS 32 is steered to try to have the frame event occur in synchronization with the timing event such as the once per second pulse. In controlling the algorithm, however, the controller must also limit the phase steps to the maximum permitted of the timing source for the BTS 32. Limiting of the phase step correction can be done by controlling the gain of the closed loop filtering algorithm and providing appropriate damping.

Figure 2B:
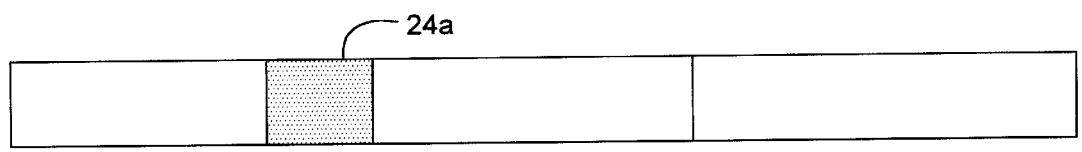
Figure 2B:
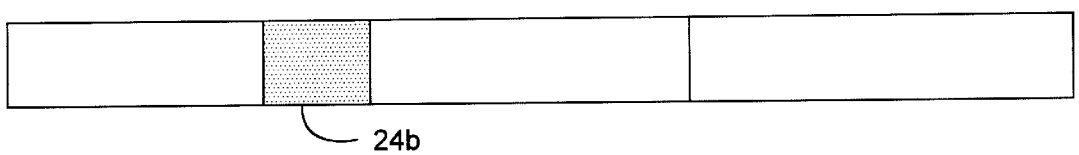

If a plurality or all of the BTS's 32 in the network implement this algorithm and all of them are programmed to have the particular frame event such as the frame emission time or the training sequence start at the same time relative to the GPS signal, all of the nodes will be in substantial timing synchronization. As a result, for example, for all of the BTS's 32 that have such a synchronizing mechanism, as shown in FIG. 2B, the training sequences 24a,b (and the rest of the various corresponding parts of the frames) from all transmitters operating on the same channel will be received by the mobile unit 16 at virtually the same time. A residual time delay due to propagation delays from the various transmitters in the network will not be eliminated. However, this will greatly reduce the co-channel interference caused in the mobile units 16 for the equalization process.

In addition, synchronizing the transmission of the frame emission times through the network 10 greatly eases handoff procedures when a mobile travels from one cell to another cell within the network 10. At the cell borders, the detected event for both BTS's 32 will be about the same for the mobile unit 16 since the propagation delays should be virtually identical since the radio waves travel approximately the same distance from the BTS's 32. Hence, a mobile unit 16 being handed off from one cell to the adjacent cell can use its current timing much more reliably for communicating with the BTS 32 of the adjacent cell as it is handed off. Further, since the frame timing of both cells is known, the network can ensure that minimal portions of the voice information are lost in the handoff.

Still further, if the cellular system uses frequency hopping, the synchronization has an even further advantage in that all of the base stations and all of the mobile units 16 in the network 10 will be in substantial synchronization with each other. Hence, transitions of BTS's 32 and mobile units 16 to different frequencies can be coordinated at the same time to again ensure fewer dropped calls.

In addition, any mobile unit 16 may accurately determine its location through the use of measuring time of arrival from three known events and then performing a trilateration calculation. In particular, since the geographic location of any three of the BTS's 32 is known, and the time of arrival of either the sync code or the start of the frame or other frame event from each cell is known, the distances from each of the BTS's 32 can also be determined. In particular, in a BTS network, if the frames are supposed to be transmitted at a certain prescribed time such as to coincide with the once per second pulse of GPS, as smoothed by the BESTIME algorithm, the propagation delay for each of the three stations can be readily determined. From that delay, the distance from each base station can be determined and then using conventional triangulation techniques, the exact location of the mobile can be determined. Either the mobile can make the location determination or the information can be transmitted to one of the BTS's 32 for making the determination elsewhere in the network 10. Particularly if the mobile unit 16 is to make the determination of the location, it may be desirable to have each of the adjacent BTS's 32 to have different frame timing so that the timing measurement, the delay calculations and the distance calculation load will be distributed over a broader range of time to minimize the average computational load on these functions on the mobile so that the mobile's processors can perform the other required tasks.

Of course, various alternative embodiments will be apparent to those of skill in the art. In addition to using GPS or Loran as the universal time information, the universal timing information can be derived from a DS-1 or an E-1 signal or an OC-3 signal. Still further, the monitoring of when the frame emission or other frame event occurs may only be done intermittently if the stability of the clocks for each BTS 32 is adequate. In addition, rather than just determine when an event in a frame occurred for one channel of a BTS 32, the determination may be made over multiple or all channels with an averaging being done to steer the phase stepping of the universal time source. In addition, those of ordinary skill will also understand that the filtering algorithm as implemented by the phase stepper's controller may also include steps of guarding against outliers in the error signals. In addition, rather than having the filtering algorithm control the stepping to have the next frame event occur exactly with the timing information such as the once per second pulse, it may be desirable for stability reasons to have the event occur a predetermined time after the timing event.

In yet another alternative embodiment, rather than providing the one pulse per second GPS timing signal to the phase stepper, the phase stepper may actually step the phase of a different timing reference such as an E1 signal supplied to the BTS. In addition, rather than stepping the phase, the frequency of the timing reference for the BTS can be increased or decreased temporarily to control the frame emission timing. This can be readily accomplished with an NCO by increasing or decreasing the control word to advance or retard the next frame emission or other frame event. Once the frame emission is occurring at the desired time, the frequency of the output of the timing reference supplied to the BTS can be returned to the nominal frequency.

While the invention has been particularly shown and described with reference to preferred embodiments thereof, it will be understood by those skilled in the art that various changes in form and details may be made therein without departing from the spirit and scope of the invention.

We claim:

1. A method of synchronizing the timing of a base station transmitter of a network for a cell transmitting, repeatedly in response to associated clock timing information having a phase, on at least one frequency, information denoting an event, the timing of the even to occur nominally at a particular time as denoted by universal timing information that can be received within the cell, the method, comprising:

repeatedly determining from a signal received from the transmitter by an associated clock when the event information was in fact transmitted;

repeatedly determining an amount of timing error from the nominal time;

processing according to a filtering algorithm the amount of the timing error; and altering the phase of the associated clock timing information based on the processing according to the filtering algorithm to correct the amount of timing error, wherein the signal received from the base station transmitter by the associated clock has been transmitted from an antenna and received by a GSM_receiver.

2. The method of claim 1, wherein the signal received from the base station transmitter by the associated clock has been transmitted through a bridge.

3. The method of claim 1, wherein the event is transmitted by the base station transmitter over a plurality of frequency channels and the event is received by the associated clock over only one of the frequency channels.

4. A process of making a synchronizing time division cellular network from an unsynchronized cellular network operating according to a time division multiple access cellular network protocol, the network including a base station transmitter in each cell transmitting information including repetitive events based upon an associated clock signal having a phase provided to the transmitter, the network being located in an area where a universal timing signal may be obtained to provide timing information, the process comprising:

providing in association with each base station transmitter error information indicating when the repetitive events occur relative to the timing information; and altering either the phase or the frequency of the associated clock signal at each of the base stations so that the repetitive events are transmitted substantially simultaneously at each of the transmitters, wherein the associated clock signal is obtained from a GSM frame measurement device.

5. A process of making a synchronizing time division cellular network from an unsynchronized cellular network operating according to a time division multiple access cellular network protocol, the network including a base station transmitter in each cell transmitting information including repetitive events based upon an associated clock signal having a phase provided to the transmitter, the network being located in an area where a universal timing signal may be obtained to provide timing information, the process comprising:

providing in association with each base station transmitter error information indicating when the repetitive events occur relative to the timing information; and altering either the phase or the frequency of the associated clock signal at each of the base stations so that the repetitive events are transmitted substantially simultaneously at each of the transmitters, wherein the associated clock signal is obtained from a GSM frame measurement device that is coupled to the base station transmitter through a radio interface including a GSM receiver.

6. The process of claim 5, wherein the phase of the associated clock signal is obtained by averaging over multiple channels.

7. The method of claim 5, wherein the associated clock timing information is obtained from a frame measurement device.

8. A method of synchronizing the timing of a base station transmitter of a network for a cell transmitting, repeatedly in response to associated clock timing information having a phase, on at least one frequency, information denoting an event, the timing of the even to occur nominally at a particular time as denoted by universal timing information that can be received within the cell, the method, comprising:

repeatedly determining from a signal received from the transmitter by an associated clock when the event information was in fact transmitted;

repeatedly determining an amount of timing error from the nominal time;

processing according to a filtering algorithm the amount of the timing error; and altering the phase of the associated clock timing information based on the processing according to the filtering algorithm to correct the amount of timing error, wherein the associated clock timing information is obtained from a GSM frame measurement device.

9. A method of synchronizing a time division cellular network comprising a plurality of transmitters transmitting information located in different locations, each of the transmitters being located in an area where common timing information may be received, each transmitter having an associated clock for controlling the transmission of repetitive events in the transmitted information, the method comprising:

determining at each transmitter, when, relative to the timing information, at least some of the repetitive events in the transmitted information occur; and steering the associated clock so that the repetitive events are transmitted at substantially the same time throughout the time division cellular network, wherein the associated clock signal is obtained from a GSM frame measurement device.

10. A method of synchronizing a time division cellular network comprising a plurality of transmitters transmitting information located in different locations, each of the transmitters being located in an area where common timing information may be received, each transmitter having an associated clock for controlling the transmission of repetitive events in the transmitted information, the method comprising:

determining at each transmitter, when, relative to the timing information at least some of the repetitive events in the transmitted information occur; and steering the associated clock so that the repetitive events are transmitted at substantially the same time throughout the time division cellular network, wherein the associated clock signal is obtained from a GSM frame measurement device that is coupled to the base station transmitter through a radio interface including a GSM receiver.

11. The method of claim 10, wherein the associated clock signal is obtained from a frame measurement device.

* * * * *